(12) United States Patent
Hertter et al.

(10) Patent No.: US 8,697,184 B2
(45) Date of Patent: Apr. 15, 2014

(54) GAS DYNAMIC COLD SPRAYING OF OXIDE-CONTAINING PROTECTIVE LAYERS

(75) Inventors: Manuel Hertter, München (DE); Andreas Jakimov, München (DE); Stefan Schneiderbanger, Bergkirchen (DE)

(73) Assignee: MTU Aero Engines GmbH, Munich (DE)

( * ) Notice: Subject to any disclaimer, the term of this patent is extended or adjusted under 35 U.S.C. 154(b) by 883 days.

(21) Appl. No.: 12/834,346

(22) Filed: Jul. 12, 2010

(65) Prior Publication Data

US 2011/0014055 A1 Jan. 20, 2011

(30) Foreign Application Priority Data

Jul. 17, 2009 (DE) .......................... 10 2009 033 620

(51) Int. Cl.
*B05D 1/12* (2006.01)

(52) U.S. Cl.
USPC ........... 427/190; 427/191; 427/192; 427/196; 427/427

(58) Field of Classification Search
USPC .................................. 427/190–192, 196, 427
See application file for complete search history.

(56) References Cited

U.S. PATENT DOCUMENTS

| 4,952,715 A * | 8/1990 | Blum et al. ................... 556/409 |
| 5,516,586 A * | 5/1996 | Singer et al. .................. 428/433 |
| 2009/0202732 A1* | 8/2009 | Kruger et al. ................. 427/427 |

FOREIGN PATENT DOCUMENTS

| DE | 19652649 A1 | 6/1998 |
| DE | 102004059716 B3 | 4/2006 |
| DE | 102005005359 A1 | 8/2006 |
| DE | 102005031101 B3 | 8/2006 |
| DE | 102005047688 B3 | 11/2006 |
| DE | 102006009751 A1 | 9/2007 |
| DE | 102006010521 A1 | 9/2007 |
| DE | 102008016969 B3 | 7/2009 |
| EP | 1903127 A1 | 3/2008 |
| WO | 2008037237 A1 | 4/2008 |

* cited by examiner

*Primary Examiner* — Frederick Parker
(74) *Attorney, Agent, or Firm* — Barlow, Josephs & Holmes, Ltd.

(57) ABSTRACT

The present invention relates to a method for producing a coating on a gas turbine component, in which particles at least of parts of a material to be applied as coating are accelerated by means of kinetic gas dynamic cold spraying in a spray jet onto the surface (2) of the component (1) to be coated, wherein a reactive gas is fed into the spray jet (6), so that the reactive gas reacts at least partially with the particles of the coating material when the particles impinge on the surface (2) to be coated and/or wherein the deposited layer (9) is heated locally and/or over a large area and impacted with a reactive gas, as well as a gas turbine component produced in this way.

15 Claims, 1 Drawing Sheet

GAS DYNAMIC COLD SPRAYING OF OXIDE-CONTAINING PROTECTIVE LAYERS

BACKGROUND OF THE INVENTION

1. Field of the Invention

The present invention relates to a method for producing a coating on a gas turbine component by means of kinetic gas dynamic cold spraying and to a correspondingly produced gas turbine component, in particular an aviation turbine component.

2. Prior Art

During the combustion of fuel and at the flow velocities of the streaming gases, gas turbines are subjected to high loads on the employed materials in terms of erosion, corrosion, and the like. Accordingly, components in gas turbines, whether in the compressor area or in the turbine area, are furnished with appropriate protective layers, such as protective layers against wear, protective layers against erosion, protective layers against heat, and protective layers against corrosion. Such protective layers must have a special properties profile in order to satisfy the high requirements placed on their use in a gas turbine and, in particular, in an aviation turbine. Accordingly, such protective layers must fulfill precise specifications, for example, in regard to their material composition. However, the properties profile also depends on the processing of the corresponding material, that is, for example, on the type of application. Thus, for example, certain protective layers, which are to have a certain hardness and wear resistance, must have a sufficient oxide content in order to achieve these properties. Accordingly, such layers are applied using specific coating methods, which ensure that the properties profile can be adjusted according to the requirements. For example, CoMoCrSi alloys having the trade name Triballoy, such as, for example, T 400 or T 800, are applied by thermal spraying methods, so that, because of the high temperatures and the presence of oxygen during the application, oxides that are required for the wear resistance and hardness are formed in the deposited layer.

However, thermal spraying methods, such as, for example, high-velocity flame spraying (high-velocity oxide fuel coating) or plasma spraying methods, have drawbacks in terms of their effectiveness and with regard to other properties of the deposited layers, such as, for example, the mechanical properties. Therefore, there exists a need to provide alternatives to these respective protective layers and the coating methods therefor.

DISCLOSURE OF THE INVENTION

Problem of the Invention

Therefore, the problem of the present invention is to provide alternatives for protective layers on gas turbine components as well as corresponding coating methods that avoid the drawbacks of the prior art and, in particular, make possible a balanced properties profile of the layers as well as an economical and effective deposition of the layers. In particular, a corresponding coating method should enable the realization of a plurality of properties of the deposited layer in a mutually balanced relationship, it being well possible for the different properties to be mutually opposite or mutually opposed. Thus, for example, an effort is made, in particular, to produce hard and wear-resistant as well as heat-stable layers having, at the same time, strong adhesion to the component and to do this in a simple and effective manner.

Technical Solution

This problem is solved by a method for producing turbine component by feeding a reactive gas into a kinetic gas dynamic cold spraying spray jet and optionally applying heat locally or over a large area of the component or impacting the component with reactive gas. This problem is also solved by a gas turbine component having a coating applied by this method. Further advantageous embodiments of the invention are the subject of the dependent claims.

The invention proceeds from the knowledge that certain layer materials can be applied advantageously by kinetic gas dynamic cold spraying for the formation of protective layers on gas turbine components when, in order to obtain a specific composition, a reactive gas is simultaneously fed into the spray jet, so that, when the particles accelerated by the kinetic gas dynamic cold spraying impinge on the surface to be coated, they can react with the reactive gas in order to achieve the desired chemical composition. In this way, it is possible to exploit kinetic gas dynamic cold spraying or kinetic cold gas compaction for coatings that hitherto could only be sprayed thermally, because, during thermal spraying, specific properties are obtained, such as, for example, the adjustment of a specific oxide content. In the case of protective layers for gas turbines, kinetic gas compaction enables high adhesion to the base material, and in particular, a high adhesive tensile strength, greater layer thicknesses, and advantages in terms of a surface solidification can be achieved, while, at the same time, the advantages of a high degree of application and a lower required coverage for the component to be coated can be obtained along with a simpler component processing. Due to the transformation of the kinetic energy of the cold-gas-sprayed particles into deformation work, the particles are heated when they impinge on the surface to be coated and local temperature peaks are created on the particle surface. The reactive gas can react there with the spayed particles to form the requisite reaction products that are required in the layer composition.

The reactive gas can be fed into the spray jet at various points. Preferably, however, the reactive gas is sprayed in directly at the site of reaction, that is, at the point where the particles impinge on the surface to be coated, so as to achieve there the maximum effect. However, the reactive gas can also be sprayed in at any other point between the outlet of the cold spraying nozzle and the point of impingement on the surface to be coated.

In addition, the deposited layer can be heated in order to improve or accelerate the reaction of the deposited particles with the reactive gas. In this case, the heating can be performed locally in a defined area and/or over a large surface. For example, the spray jet can be passed in a rasterlike manner, as in the case of a scanner, over the surface to be coated in order to create the coating so as to coat the entire surface. In the same way, an appropriate heating device, such as, for example, a gas burner, in particular, an acetylene burner, can be moved simultaneously with the cold spraying device, or following it, over the corresponding surface. Obviously, it is also possible to move the surface of the component to be coated in relation to a fixed gas dynamic cold spraying device or in relation to a heating device.

Additionally or alternatively to the local heating, a large-area heating, in particular a heating of the entire component bearing the deposited layer, can take place in an oven or similar heating unit after application of the layer or of portions of the layer.

In addition, in conjunction with the heating of the deposited layer, it is also possible to further impact the reactive gas on the layer or to flood the layer with reactive gas. Thus, for example, in addition to the heating device, which, subsequent to the gas dynamic cold spraying, appropriately warms the deposited layer, a gas lance can be passed over the layer as well, which directs the reactive gas onto the heated area of the coating in order to supply sufficient reactive gas for a reaction with the deposited layer.

Correspondingly, in accordance with another aspect of the present invention, for which a self-contained and independent protection is desired, a combination of kinetic gas dynamic cold spraying along with a subsequent local and/or large-area heating of the deposited layer with simultaneously impacting of the reactive gas on the deposited layer or flooding the deposited layer with a reactive gas can be performed.

Besides a simultaneous application of reactive gas during the local and/or large-area heating, it is also possible for the flooding of the deposited layer with the reactive gas or the impacting of the reactive gas on the deposited layer to take place shortly after a local and/or large-area heating.

The coating can be applied in layers to the surface, so that a great layer thickness can be obtained. At the same time, it is ensured that the reaction with the reactive gas can take place over the entire layer thickness in a uniform manner.

Furthermore, the coating can be applied in a rasterlike manner by "scanning" it onto the surface to be coated, for example by a relative movement of the gas dynamic cold spraying device and the surface to be coated. In the same way, it is possible to move appropriate heating devices and/or gas lances for local heating and for supply of reactive gas.

The reactive gas can be, in particular, oxygen or it may contain oxygen in order to create corresponding oxides in the deposited layer. Corresponding oxide-containing protective layers serve in gas turbines particularly for wear protection and corrosion protection or erosion protection. Accordingly, the particles or the particle powder that are or is deposited on the surface of the component to be coated by kinetic gas dynamic cold spraying or kinetic cold gas compaction can be formed from materials and/or contain at the least constituents of appropriate materials that create oxide-containing layers, hard material layers, protective layers against wear, protective layers against corrosion, protective layers against oxidation, protective layers against heat, and/or protective layers against erosion. In particular, it is possible to deposit materials or to produce corresponding layers that might be deposited also by high-velocity flame spraying and/or plasma spraying, that is, in general, by thermal spraying methods, because they create automatically the corresponding oxides at the high process temperatures used there in the presence of oxygen.

Coming into consideration for gas turbine components, in particular aviation turbine components, are layers made up of Ni-based alloys, Co-based alloys, Ti-based alloys, CrNi alloys, WC materials, steels, CoMoCrSi alloys, and/or MCrAlY alloys with M being Ni and/or Co.

By means of kinetic cold gas compaction, it is possible, in particular, to deposit layers of greater layer thickness in the range from 20 μm to 20 mm, in particular from 0.1 to 10 mm.

The invention relates particularly to corresponding gas turbine components, in particular to aviation turbine components having layers deposited in accordance with the invention, which may be characterized in that the structure is characterized by the deformed grains of the impinging particles as well as corresponding oxides.

BRIEF DESCRIPTION OF THE FIGURES

Further advantages, properties, and features of the present invention are made clear in the following detailed description of an exemplary embodiment on the basis of the attached figures. Here, the figures show, in a purely schematic manner, in FIG. 1 a drawing of the principle of a device for carrying out the method according to the invention, and in FIG. 2 a partial sectional view through a component coated in accordance with the invention.

EXEMPLARY EMBODIMENT

Figure 1:
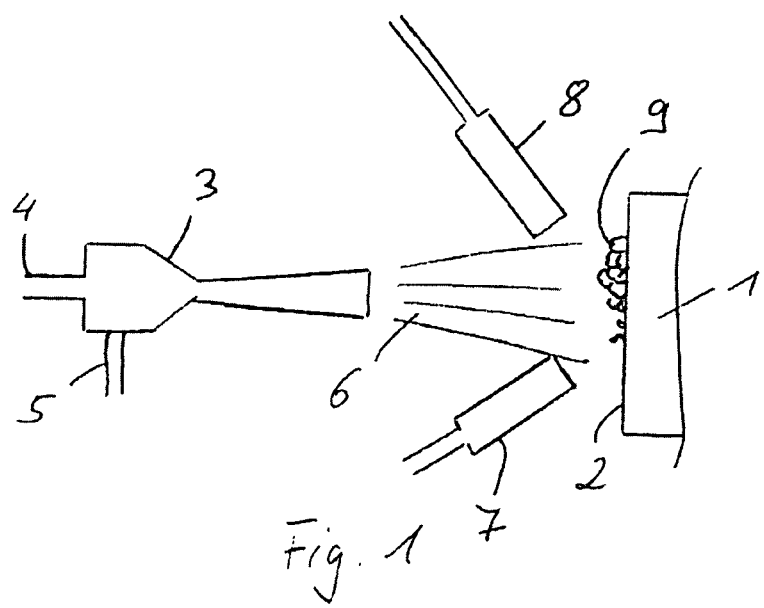

FIG. 1 shows a drawing of the principle of a device by means of which the kinetic gas dynamic cold spraying method according to the invention can be carried out.

The component 1 to be coated having the surface 2 to be coated is arranged opposite a so-called Laval nozzle 3 or an appropriately equipped gas dynamic cold spraying device, so that the spray jet 6, containing the powder particles, can impinge on the surface 2 to be coated. In order to produce the spray jet 6, a process gas is fed into the gas dynamic cold spraying device 3 via the feed line 4 of the gas dynamic cold spraying device 3, for example, and mixed with appropriate powder particles, which are fed via the feed line 5 into the gas dynamic cold spraying device 3, and passed at high pressure through the Laval nozzle 3, so that very high outlet velocities are obtained for the spray jet 6. The outlet velocity extends into the range of the speed of sound. The powder particles correspondingly accelerated onto the surface 2 to be coated are deformed when they impinge on the surface 2 due to their kinetic energy, the deformation resulting in a corresponding heating with temperature peaks at the deformed particles.

The above is exploited in the method according to the invention to effect a reaction of the particles with the reactive gas by means of flooding the surface with the reactive gas, such as, for example, with oxygen. Provided for this purpose is a gas lance 7, by means of which the reactive gas, such as, for example, oxygen, can be directed into the spray jet 6 and/or onto the site of impingement of the particles on the surface 2 to be coated.

Furthermore, it is possible to provide an additional heating device 8 in the form, for example, of a gas burner, which makes possible a local heating of the surface 2 to be coated. As a result, the reaction of the coated particles with the reactive gas, that is, for example, the oxide formation can be supported. The local heating by the heating device 8 can be provided, in addition, directly during impingement of the particles on the surface to be coated or as a subsequent heating of the deposited layer 9.

Furthermore, it is possible, simultaneously with the subsequent local heating, for a further flooding of the already coated surface 2 with the reactive gas to take place. In this case, a sufficient resupply of the reactive gas, that is, of the chemical element that is to react with the layer particles, is ensured. On the other hand, it is possible to dispense with an additional flooding with the reactive gas during the local heating if sufficient gas is already present due to the flooding of the surface with the reactive gas during the kinetic gas dynamic cold spraying.

Additionally or alternatively to the local heating, it is possible by means of, for example, gas burner 8, such as is illustrated schematically in FIG. 1, to also carry out a large-area heat treatment, for example by temperature equilibration of the entire component 1 after the coating, during which reactive gas that is still unconsumed and present in the layer can react with the layer material.

Component 1 to be coated, in particular, can be a component of a gas turbine, in particular an aviation turbine, turbine being understood to refer to the entire device and not only to the areas of the respective device also referred to as the turbine part. In particular, the present method for coating by means of cold gas compaction with supply of a reactive gas, such as, oxygen, in particular, can be used for depositing oxide-containing layers that hitherto have been deposited conventionally by thermal spraying methods in order to form the required oxides during thermal spraying. Accordingly, it is possible to deposit layers that have hitherto conventionally been produced by means of high-velocity flame spraying or plasma spraying, such as, for example, protective layers against wear, protective layers against erosion, hard material layers, and similar protective coatings. Accordingly, it is possible to employ powder particles that contain at least the constituents of such layers. Coming into consideration, accordingly, particularly are powder particles made up of Ni-based alloys, Co-based alloys, Ti-based alloys, CrNi alloys, WC materials, steels, CoMoCrSi alloys, and/or MCrAlY alloys with M being Ni and/or Co. Thus, alloys such as Inconel 718, Inconel 625, Hastalloy C4, Hastalloy B, Hastalloy C 276, Triballoy T 800, Triballoy T 400, and the like, which conventionally are deposited on components by high-velocity flame spraying or plasma spraying, can be deposited or produced by kinetic cold gas compaction, with the corresponding oxide content being determined by an adjusted oxygen flooding during the deposition and/or a subsequent treatment.

Figure 2:
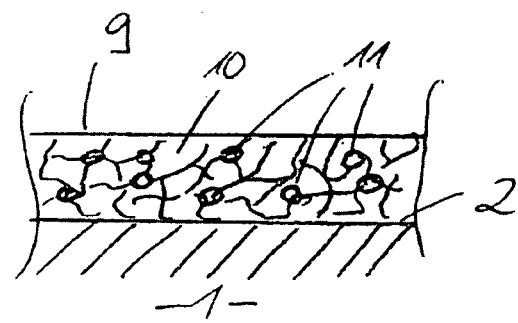

FIG. 2 shows a partial sectional view through a coated component 1, for which the fully deposited coating 9 on the surface 2 to be coated can be seen. Shown here, besides the deformed particles 10, which, due to deformation, form a solid composite and a firmly adhering layer 9, is that, due to the presence of the reactive gas in the spray jet or during impingement of the particles of surface 2 to be coated, the corresponding oxides 11 are formed.

Even though the present invention has been described in detail on the basis of the illustrated exemplary embodiment, it is obvious to the skilled practitioner that the invention is not limited to this embodiment, but rather that modifications in the form of leaving out individual features or a differing combination of the presented features are possible without departing from the scope of protection of the accompanying claims. In particular, the present invention comprises all combinations of the presented features.

The invention claimed is:

1. A method for producing a coating on a gas turbine component, comprising the steps of:
    spraying particles onto a surface of the component to be coated by accelerating the particles in a kinetic gas dynamic cold spraying spray jet, so that the particles are directed towards the surface and impinge the surface forming a deposited layer of the particles; and
    feeding an oxygen-containing reactive gas into the spray jet, so that the oxygen-containing reactive gas reacts at least partially with the particles when the particles impinge on the surface;
    wherein during the step of feeding an oxygen-containing reactive gas into the spray jet, the oxygen-containing reactive gas is introduced to the particles at a location selected from the group consisting of a location along the spray jet that is outside of the spray nozzle, and a point of impingement of the particles on the surface.

2. The method according to claim 1, further comprising the step of:
    heating the surface at a location selected from the group consisting of a point of impingement of the particles on the surface, and the entire surface.

3. The method of claim 2 wherein the heating and feeding steps are simultaneous.

4. The method of claim 2 wherein the heating step is performed before the feeding step.

5. The method of claim 1 further comprising the step of:
    coating the surface by passing the spray jet over the surface in a raster manner.

6. The method of claim 1, further comprising the step of:
    applying a coating of the particles in layers.

7. The method of claim 1, wherein the particles react with the oxygen-containing reactive gas to form at least one of: oxide-containing layers, protective layers against wear, protective layers against oxidation, and protective layers against heat.

8. The method of claim 1, wherein the particles can be deposited by at least one of: high-velocity flame spraying and plasma spraying.

9. The method of claim 1, wherein the particles comprise materials selected from the group of: Ni-based alloys, Co-based alloys, Ti-based alloys, CrNi alloys, NiAl alloys, WC materials, steels, CoMoCrSi alloys, and MCrAlY; wherein M is selected from the group consisting of Ni and Co.

10. The method according to claim 1, wherein forming a deposited layer of the particles further comprises the step of:
    depositing a layer with a thickness of 20 μm to 20 mm.

11. The method according to claim 1, wherein forming a deposited layer of the particles further comprises the step of:
    depositing a layer with a thickness of 0.1 mm to 10 mm.

12. A method for producing a coating on a gas turbine comprising the steps of:
    spraying particles onto a surface of the component to be coated by accelerating the particles in a kinetic gas dynamic cold spraying spray jet, so that the particles are directed towards the surface and impinge the surface, forming a deposited layer of the particles;
    heating the surface; and
    feeding an oxygen-containing reactive gas into the spray jet, so that the oxygen-containing reactive gas reacts at least partially with the particles when the particles impinge on the surface;
    wherein during the step of feeding an oxygen-containing reactive gas into the spray jet, the oxygen-containing reactive gas is introduced to the particles at a location selected from the group consisting of a location along the spray jet that is outside of the spray nozzle, or a point of impingement of the particles on the surface.

13. The method of claim 12, wherein the step of heating the surface is performed at a location selected from the group consisting of the point of impingement of the particles on the surface, and the entire surface.

14. The method of claim 12 wherein the heating takes place by means of a gas burner.

15. The method of claim 14, wherein the gas burner is an acetylene burner.

* * * * *